(12) United States Patent (10) Patent No.: US 11,471,773 B2
Shriram et al. (45) Date of Patent: Oct. 18, 2022

(54) OCCLUSION IN MOBILE CLIENT RENDERED AUGMENTED REALITY ENVIRONMENTS

(71) Applicant: Krikey, Inc., Menlo Park, CA (US)

(72) Inventors: Ketaki Lalitha Uthra Shriram, San Francisco, CA (US); Jhanvi Samyukta Lakshmi Shriram, San Francisco, CA (US); Yusuf Olanrewaju Olokoba, Hanover, NH (US)

(73) Assignee: Krikey, Inc., Menlo Park, CA (US)

( * ) Notice: Subject to any disclaimer, the term of this patent is extended or adjusted under 35 U.S.C. 154(b) by 43 days.

(21) Appl. No.: 16/905,512

(22) Filed: Jun. 18, 2020

(65) Prior Publication Data

US 2021/0031108 A1 Feb. 4, 2021

Related U.S. Application Data

(60) Provisional application No. 62/895,826, filed on Sep. 4, 2019, provisional application No. 62/881,871, filed on Aug. 1, 2019.

(51) Int. Cl.
*A63F 13/65* (2014.01)
*G06T 19/00* (2011.01)
*A63F 13/213* (2014.01)
*H04L 67/131* (2022.01)

(52) U.S. Cl.
CPC ............ *A63F 13/65* (2014.09); *A63F 13/213* (2014.09); *G06T 19/006* (2013.01); *A63F 2300/8082* (2013.01); *H04L 67/131* (2022.05)

(58) Field of Classification Search
None
See application file for complete search history.

(56) References Cited

U.S. PATENT DOCUMENTS

| 9,390,560 | B2 * | 7/2016 | Meier | G06T 15/20 |
| 10,068,369 | B2 * | 9/2018 | James | G06T 15/60 |
| 10,580,040 | B2 * | 3/2020 | Du | G06Q 30/0276 |
| 10,586,360 | B2 * | 3/2020 | DeLuca | G06F 3/013 |

(Continued)

FOREIGN PATENT DOCUMENTS

WO WO 2013/155217 A1 10/2013

OTHER PUBLICATIONS

PCT International Search Report and Written Opinion, PCT Application No. PCT/US20/39186, dated Sep. 4, 2020, 17 pages.

(Continued)

*Primary Examiner* — James S. McClellan
*Assistant Examiner* — Peter J Iannuzzi
(74) *Attorney, Agent, or Firm* — Fenwick & West LLP (57) ABSTRACT

An augmented reality (AR) game system hosted and executed on a mobile client enables occlusion of AR game elements by objects in the real world. The mobile client captures a camera view of an environment including a real-world object. The AR game system identifies a cluster of feature points associated with the real-world object and generates a mesh from the cluster. The AR game system represents the mesh on a virtual coordinate plane, such that an AR game element can appear to interact with the real-world object. The AR game system renders, on the mobile client, the AR game element to appear as though it is occluded by the real-world object.

17 Claims, 8 Drawing Sheets

(56) References Cited

U.S. PATENT DOCUMENTS

| 10,600,247 B2* | 3/2020 | Walton ............... G06K 9/00201 |
| 10,970,867 B2* | 4/2021 | Anadure ............ G06K 9/00671 |
| 2011/0075919 A1 | 3/2011 | Gokturk et al. |
| 2012/0206452 A1* | 8/2012 | Geisner .................. H04S 7/304 |
| | | 345/419 |
| 2013/0286004 A1 | 10/2013 | McCulloch et al. |
| 2014/0028715 A1 | 1/2014 | Fulks et al. |
| 2015/0130790 A1* | 5/2015 | Vasquez, II ........... G06T 19/006 |
| | | 345/419 |
| 2019/0325661 A1* | 10/2019 | Baumbach .............. G06F 3/011 |
| 2020/0074725 A1* | 3/2020 | Skidmore ............. G06T 15/506 |
| 2020/0380790 A1* | 12/2020 | Bedard .................. G06T 15/60 |

OTHER PUBLICATIONS

Yang, M. Y. et al., "Plane Detection in Point Cloud Data," Technical Report Nr. 1, 2010, Department of Photogrammetry, Institute of Geodesy and Geoinformation, University of Bonn, Jan. 25, 2010, pp. 1-16.

* cited by examiner

OCCLUSION IN MOBILE CLIENT RENDERED AUGMENTED REALITY ENVIRONMENTS

CROSS REFERENCE TO RELATED APPLICATIONS

This application claims the benefit of U.S. Provisional Application No. 62/881,871, filed Aug. 1, 2019, and U.S. Provisional Application No. 62/895,826, filed Sep. 4, 2019, which are incorporated by reference in their entireties.

TECHNICAL FIELD

The disclosure generally relates to the field of mobile rendered augmented reality and more specifically to object occlusion in mobile rendered augmented reality environments.

BACKGROUND

During game play on a mobile computing device with a screen, a user may want to employ object occlusion in the context of an image rendered on the screen. Conventional solutions for occlusion are incompatible among a broad range of mobile computing clients and operating systems. Moreover, conventional solutions often require immense computing resources such as significant processing power and available memory capacity. Accordingly, to ensure that object occlusion is accessible for all users, there is a need for a mobile compatible and performant object occlusion solution that functions across mobile computing clients and operating systems.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One example embodiment of a disclosed system, method and computer readable storage medium that includes occluding objects that are displayed on a screen of a mobile client rendered augmented reality (AR) game system. Conventional occlusion solutions designed for mobile clients (e.g., APPLE Inc.'s AR Kit) only work well with newer mobile devices that include LiDAR sensors and operate on APPLE iOS systems. Accordingly, described is a configuration that allows object occlusion in a mobile rendered AR game system across several generations of mobile devices, including those that operate using GOOGLE ANDROID systems, and does not require LiDAR sensors.

In one example configuration, a camera coupled with the mobile client (e.g., integrated with the mobile client or wirelessly or wired connection with the mobile client) captures a camera view of an environment. The environment may correspond to the physical world, which includes an object that may be positioned with a field of view of the camera. A processor (e.g., of the mobile device) processes program code that causes the processor to execute specified functions as are further described herein. Accordingly, the processor receives the camera view and several feature points, identified from the camera view, associated with the object in the environment. The processor identifies a cluster from the feature points, the cluster corresponding to a physical surface of the object. The processor generates a mesh from the cluster, transmits the mesh to a game engine, and receives a game engine rendered object (e.g., an AR object) from the game engine. The processor provides for display the game engine rendered object being occluded by the object in the environment to the mobile client. In some embodiments, a user interacts with the displayed occluded objects.

Object occlusion allows the user to view elements of the AR game as though they are interacting with reality around the user, presenting an immersive gaming experience for the user. In particular, the methods described herein allow object occlusion on a mobile client executed AR game without consuming too much processing and/or battery power.

Augmented Reality Game System Environment

Figure 1:
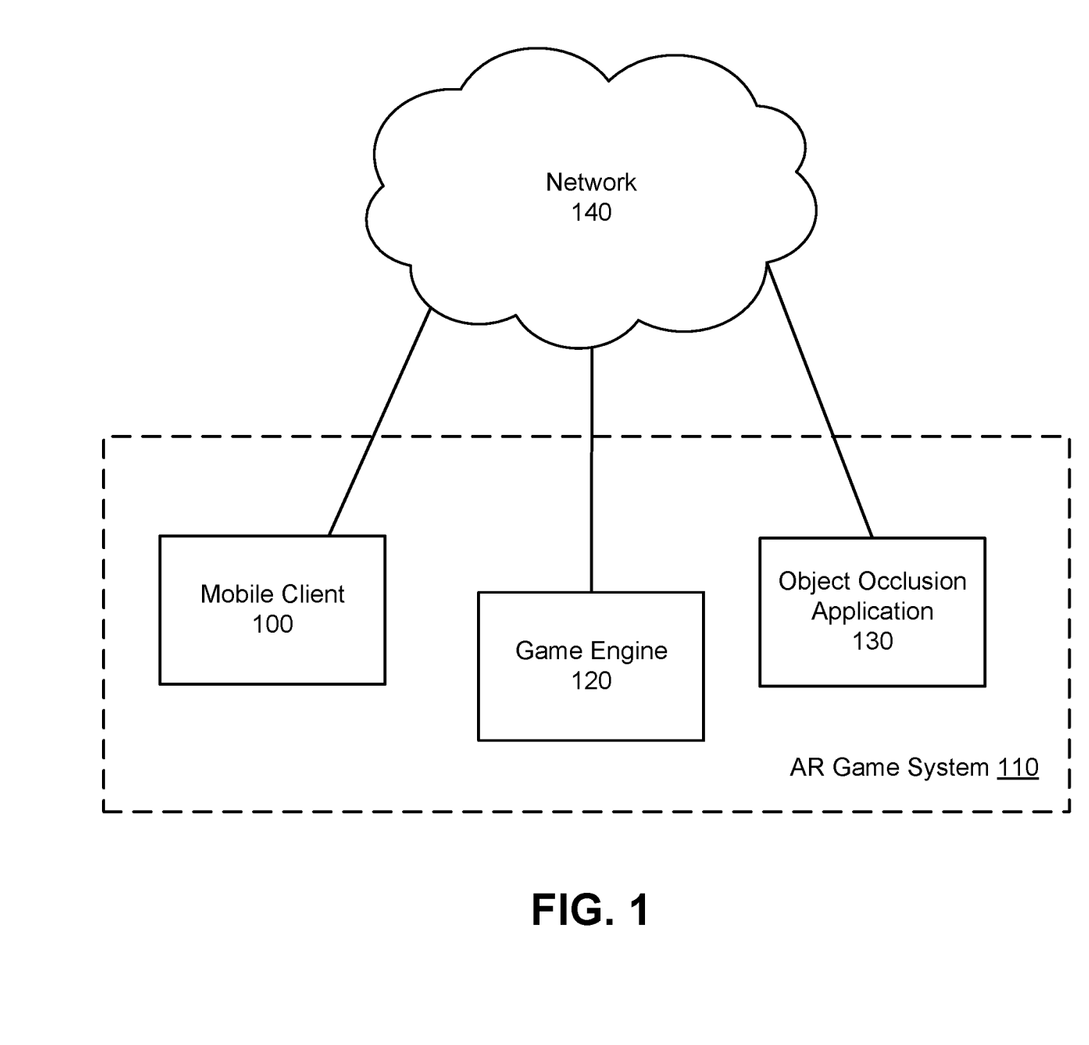
FIG. 1 illustrates one example embodiment of an augmented reality (AR) game system environment.

FIG. 1 illustrates one example embodiment of an augmented reality (AR) game system environment. The AR game system environment enables a user to play AR games on a mobile client 100, and in some embodiments, presents immersive gaming experiences to the user via object occlusion. The system environment includes a mobile client 100, an AR game system 110, a game engine 120, an object occlusion application 130, and a network 140. The AR game system 110, in some example embodiments, may include the mobile client 100, the game engine 120, and the object occlusion application 130. In other example embodiments, the AR game system 110 may include the game engine 120 and the object occlusion application 130, but not the mobile client 100, such that the AR game system 110 communicatively couples (e.g., wireless communication) to the mobile client 100 from a remote server.

The mobile client 100 is a mobile device that is or incorporates a computer, such as a smartphone, wearable device (e.g., a smart watch), and/or a portable internet enabled device. The mobile client 100 has general and/or special purpose processors, memory, storage, networking components (either wired or wireless). The mobile client 100 can communicate over one or more communication connections (e.g., a wired connection such as ethernet or a wireless communication via cellular signal (e.g., LTE, 5G), WiFi, satellite) and includes a global positioning system (GPS) used to determine a location of the mobile client 100. The mobile client 100 also includes a screen (or display) driver to provide for display interfaces on a screen associated with the mobile client 100. The mobile client 100 executes an operating system, such as GOOGLE ANDROID OS and/or APPLE iOS, and includes a display and/or a user interface that the user can interact with. The mobile client 100 also includes one or more cameras that can capture forward and rear facing images and/or videos. In some embodiments, the mobile client 100 couples to the AR game system 110, which enables it to execute an AR game.

The game engine 120 executes the AR game. For example, the game engine 120 may be a UNITY and/or UNREAL ENGINE. The game engine 120 displays, and the user interacts with, the AR game via the mobile client 100. In some embodiments, the game engine 120 is integrated into and/or hosted on the mobile client 100. In other embodiments, the game engine 120 is hosted external to the mobile client 100 and communicatively couples to the mobile client 100 over the network 140. The AR game system 110 may comprise program code that executes functions as described herein.

Figure 2:
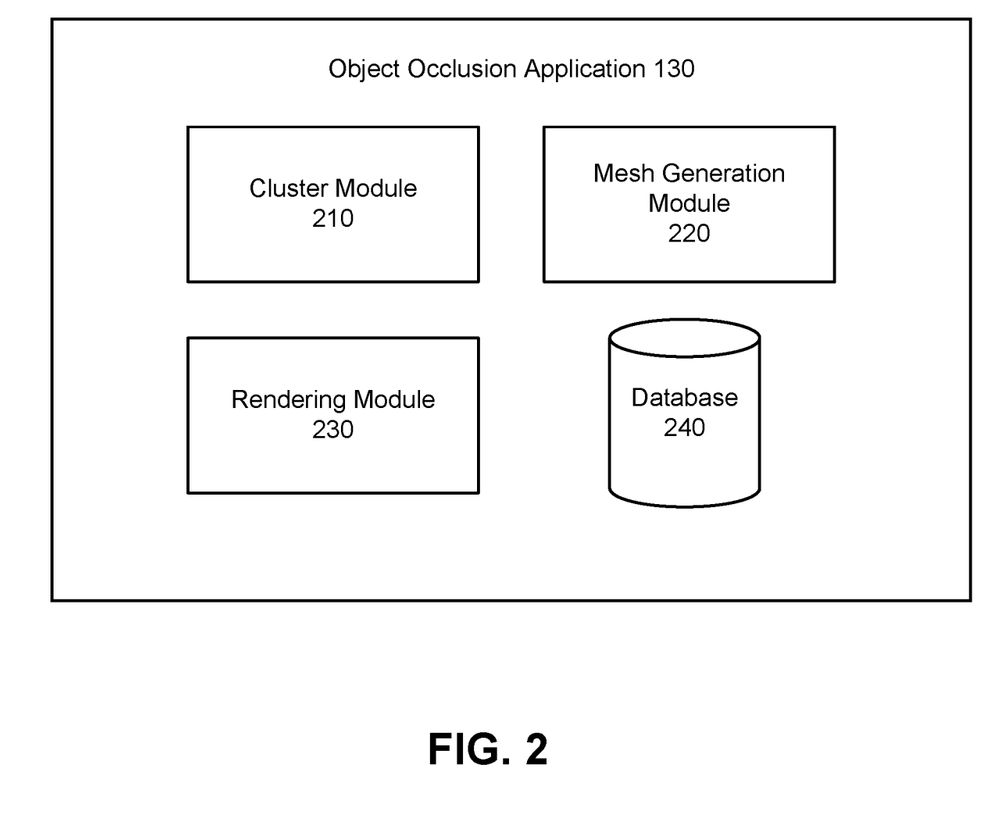
FIG. 2 illustrates one example embodiment of an object occlusion application.

In some example embodiments, the AR game system 110 includes the object occlusion application 130. The object occlusion application enables object occlusion in the AR game such that AR objects (e.g., virtual objects rendered by the game engine 120) appear to interact with real objects in an environment of the user. The user may capture a camera view (e.g., an image and/or video) of an object in a surrounding environment, e.g., via the mobile client 100. The game engine 120 renders an AR object. During game play, the object occlusion application 130 identifies and distinguishes flat surfaces (e.g., floors and walls) from the object in the environment, and then renders the AR object as partially and/or fully occluded by the object in the environment. In some embodiments, the AR object is partially and/or fully occluded by the object in the environment in response to input from the user during game play. FIGS. 2-3, described further herein, provide details on object occlusion in the AR game system 110. In some embodiments, the AR game system 110 includes applications instead of and/or in addition to the object occlusion application 130. In some embodiments, the object occlusion application 130 may be hosted on and/or executed by the mobile client 100. In other embodiments, the object occlusion application 130 is communicatively coupled to the mobile client 100.

The network 140 transmits data between the mobile client 100 and the AR game system 110. The network 140 may be a local area and/or wide area network that uses wired and/or wireless communication systems, such as the internet. In some embodiments, the network 140 includes encryption capabilities to ensure the security of data, such as secure sockets layer (SSL), transport layer security (TLS), virtual private networks (VPNs), internet protocol security (IPsec), etc.

Referring now to FIG. 2, it illustrates one example embodiment of the object occlusion application 130. The object occlusion application 130 includes a cluster module 210, a mesh generation module 220, a rendering module 230, and a database 240. In some embodiments, the object occlusion application 130 includes modules other than those shown in FIG. 2. The modules may be embodied as program code (e.g., software comprised of instructions stored on non-transitory computer readable storage medium and executable by at least one processor) and/or hardware (e.g., application specific integrated circuit (ASIC) chips or field programmable gate arrays (FPGA) with firmware. The modules correspond to at least having the functionality described when executed/operated.

Beginning with a camera, the camera associated (e.g., coupled) with the mobile client 100 may capture a camera view of an environment. The mobile client 100 provides the camera view to the game engine 120, which outputs feature points associated with the camera view of the environment.

The cluster module 210 groups the feature points received from the game engine 120 into clusters, such that each cluster corresponds to an object in the camera field of view (or cameral view). An object in the camera view of the environment may be herein referred to as a "real-world object." The cluster module 210 identifies clusters using Euclidean clustering, where feature points within a threshold distance of one another form a cluster. The cluster module 210 may identify clusters using alternative methods, in other embodiments.

A cluster corresponds to a physical surface (e.g., location and size relative to the captured image) of a real-world object. For example, the cluster module 210 may identify a cluster in an image of a room with a box. The identified cluster may correspond to the surfaces of the box, indicate a location of the box within the image of the room, and scale according to a size of the box in the image. For example, in response to an image where the box is closer, and therefore appears larger, to the mobile client 100, the cluster corresponding to the box would also become larger.

In some embodiments, the cluster module 210 identifies a plurality of clusters from the feature points received from the game engine 120, e.g., each cluster corresponding to a real-world object in the camera view of the environment. In response, the cluster module 210 determines a size of each of the clusters. Based on the determined sizes, the cluster module 210 selects one of the clusters. For example, the cluster module 210 may select the largest cluster. In another example embodiment, the cluster module 210 receives input, such as tapping, clicking, and/or a user interaction via the mobile client 100, indicating a selection of a real-world object. The cluster module 210 subsequently selects a cluster corresponding to the selected real-world object.

To accurately identify clusters of feature points associated with a real-world object, the cluster module 210 distinguishes flat, two dimensional surfaces (2D) (e.g., walls, floors) from objects in the camera view. In particular, the cluster module 210 applies a Random Sample Consensus (RANSAC) algorithm to the camera view to identify these 2D surfaces. In some embodiments, a custom matrix system application programming interface (API) enables the cluster module 210 to use the RANSAC methodology on the mobile client 100.

The mesh generation module 220 generates a three-dimensional (3D) mesh for a selected real-world object from its corresponding cluster. After the cluster module 210 identifies the cluster corresponding to the selected real-world object, the mesh generation module 220 builds a stencil shader and accordingly generates a 3D mesh that corresponds to bounds of the identified cluster. Therefore, the 3D mesh approximates the shape of the real-world object. For example, if the cluster selected by the cluster module 210 corresponds to a box, the mesh generation module 220 may generate a 3D mesh that is shaped similarly to the box. The 3D mesh of the box would correspond to a height, length, and width of the box. In addition, the mesh generation module may be configured to refine the density of the mesh. For example, a lower density mesh may provide the primary points for the 3D mesh of the object in terms of dimensions. The more refined, or higher density, mesh may allow for generating a 3D mesh that may also generate a corresponding texture of the object. Once the mesh generation module 220 generates the 3D mesh, it may be configured to convert the 3D mesh to a virtual coordinate plane and provides the 3D mesh to the rendering module 230 using, for example, a .NET bridge.

In some embodiments, the mesh generation module 220 generates the 3D mesh for a selected cluster after classifying the real-world object. For example, the object occlusion application 130 may include a machine learned classifier that classifies real-world objects in the camera view of the environment. When applied to the camera view of the environment, the classifier outputs a type for each of the real-world objects in the camera view of the environment. The mesh generation module 220 may generate the 3D mesh for the selected real-world object based on the type output by the classifier.

The rendering module 230 provides for display, on the mobile client 100, an augmented reality (AR) object occluded by the real-world object. The game engine 120 generates the AR object. When the AR object is at a location on the virtual coordinate plane that overlaps with the generated 3D mesh of the real-world object, the rendering module 230 displays the AR object as partially occluded by the real-world object. In some embodiments, the AR object fully overlaps with the generated 3D mesh, and the AR object displays the AR object as fully occluded by the real-world object. In some embodiments, the real-world object may be partially and/or fully occluded by the AR object (e.g., the AR object may be displayed in front of the real-world object, thus blocking a portion of the real-world object).

In some embodiments, during game play, the user may move the mobile client 100 to capture through the camera a second view of the environment. The cluster module 210 discards the clusters identified in the initial camera view of the environment. The game engine 120 provides the cluster module 210 with a second set of feature points, e.g., corresponding to the second view of the environment, and the cluster module 210 reidentifies clusters associated with real-world objects found in the second view of the environment. By discarding identified clusters and/or generated meshes with each new camera view of the environment and re-identifying and distinguishing flat, 2D surfaces from real-world objects in each new camera view, the AR game system 110 can efficiently render occluded objects without consuming excessive processing and battery power.

After selecting a second real-world object from the second view of the environment, the cluster module 210 identifies a cluster associated with the second real-world object, the mesh generation module 220 generates a 3D mesh for the second real-world object, and the rendering module 230 presents, for display on the mobile client 100, an AR object partially and/or fully occluded by the second real-world object. In some embodiments, the user of the AR game selects (e.g., via a user interaction with the mobile client 100) the second real-world object for occlusion.

The object occlusion application 130 may be configured to quickly adapt to and perform object occlusion in new camera views of the mobile client 100. This configuration is particularly useful in a varying game environment. For example, in some embodiments, the AR game system 110 is designed for game play across a number of locations (e.g., in a city). The mobile client 100's camera view of each location differs, since each location is different. By discarding previously identified clusters and/or generated meshes, and regenerating 3D meshes for a current view of the mobile client 100, the object occlusion application 130 efficiently performs object occlusion at each location, without excessively consuming battery and/or processing power of the mobile client 100.

The database 240 stores data used by the object occlusion application 130. The data may include feature points generated by the game engine 120, clusters identified by the cluster module 210, 3D meshes generated by the mesh generation module, and the game engine 120 rendered AR object, among others.

Figure 3A:
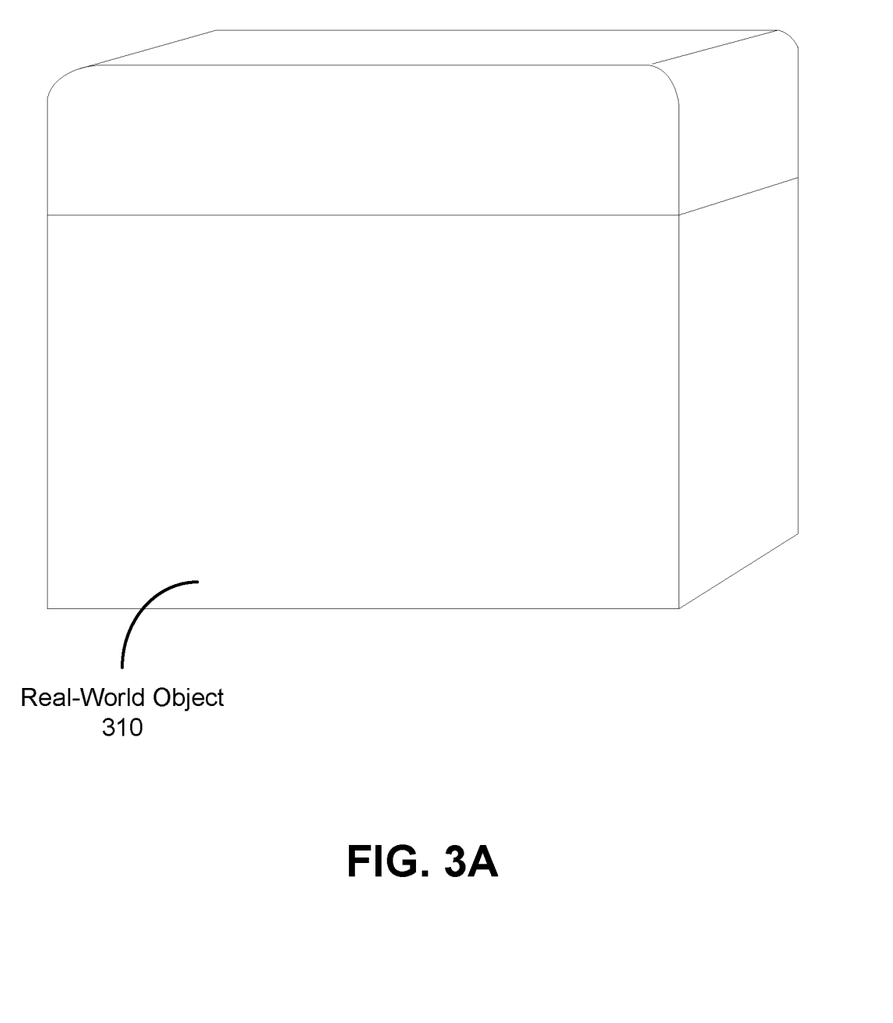
FIGS. 3A-D illustrates one example embodiment of object occlusion in an AR game system.

FIGS. 3A-D illustrates one example embodiment of object occlusion in the AR game system 110. FIG. 3A shows an example of a real-world object 310. As described above, the real-world object 310 may be captured by a camera view by the camera of, or associated with, the mobile client 100. The mobile client 100 provides the camera view to the game engine 120, which outputs a plurality of feature points.

Figure 3B:
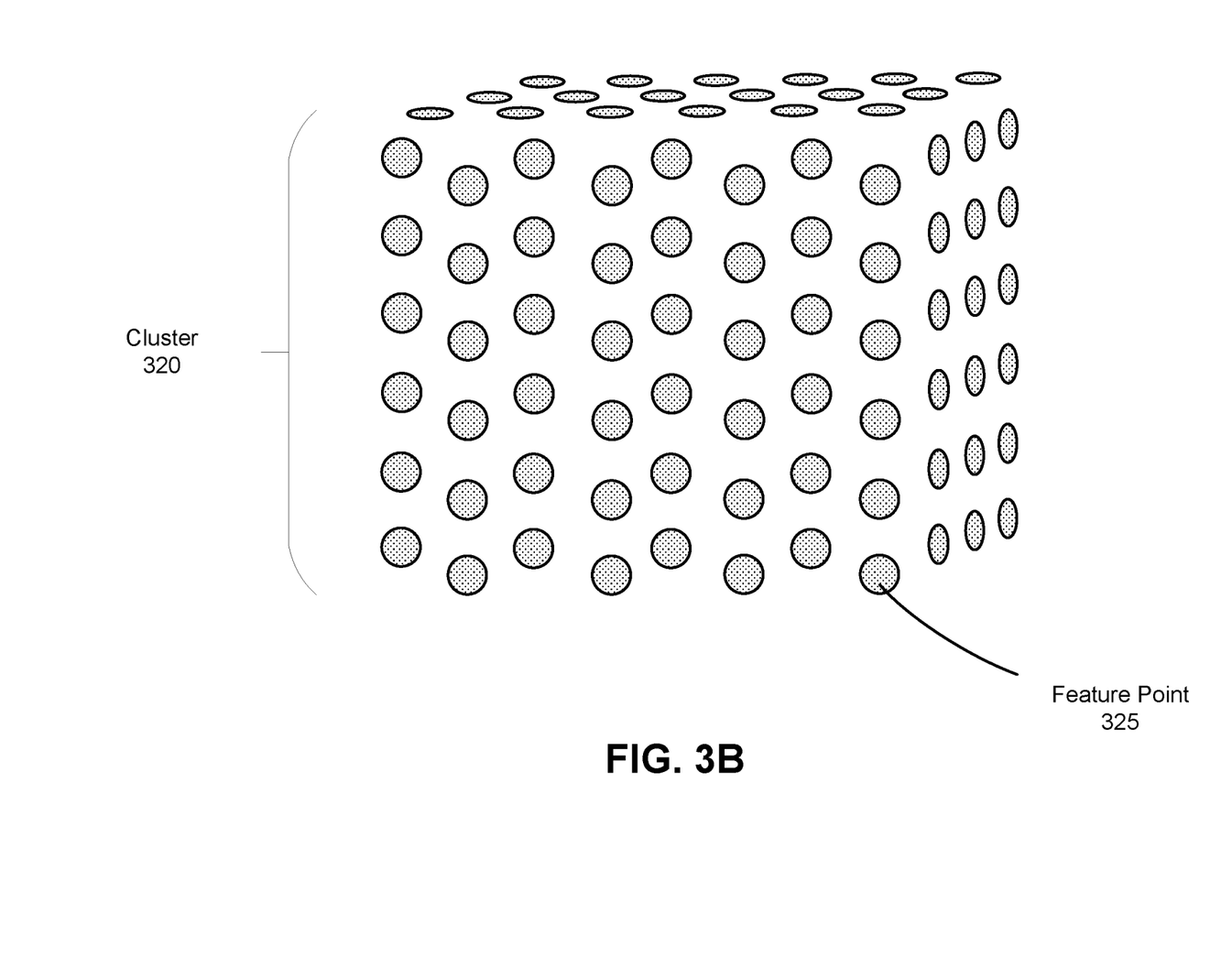

FIG. 3B shows an example of a cluster 320 corresponding to the real-world object 310. The cluster 320, identified by the cluster module 210, includes a group of feature points 325. In some embodiments, the cluster 320 designates the group of feature points 325 as the cluster 320 after determining that each of the feature points 325 are less than a threshold distance from one another. In some embodiments, the cluster module 210 identifies the cluster 320 by matching a location of the real-world object 310 with a location of a group of feature points. In other embodiments, the cluster module 210 identifies the cluster 320 by identifying the largest group of feature points.

Figure 3C:
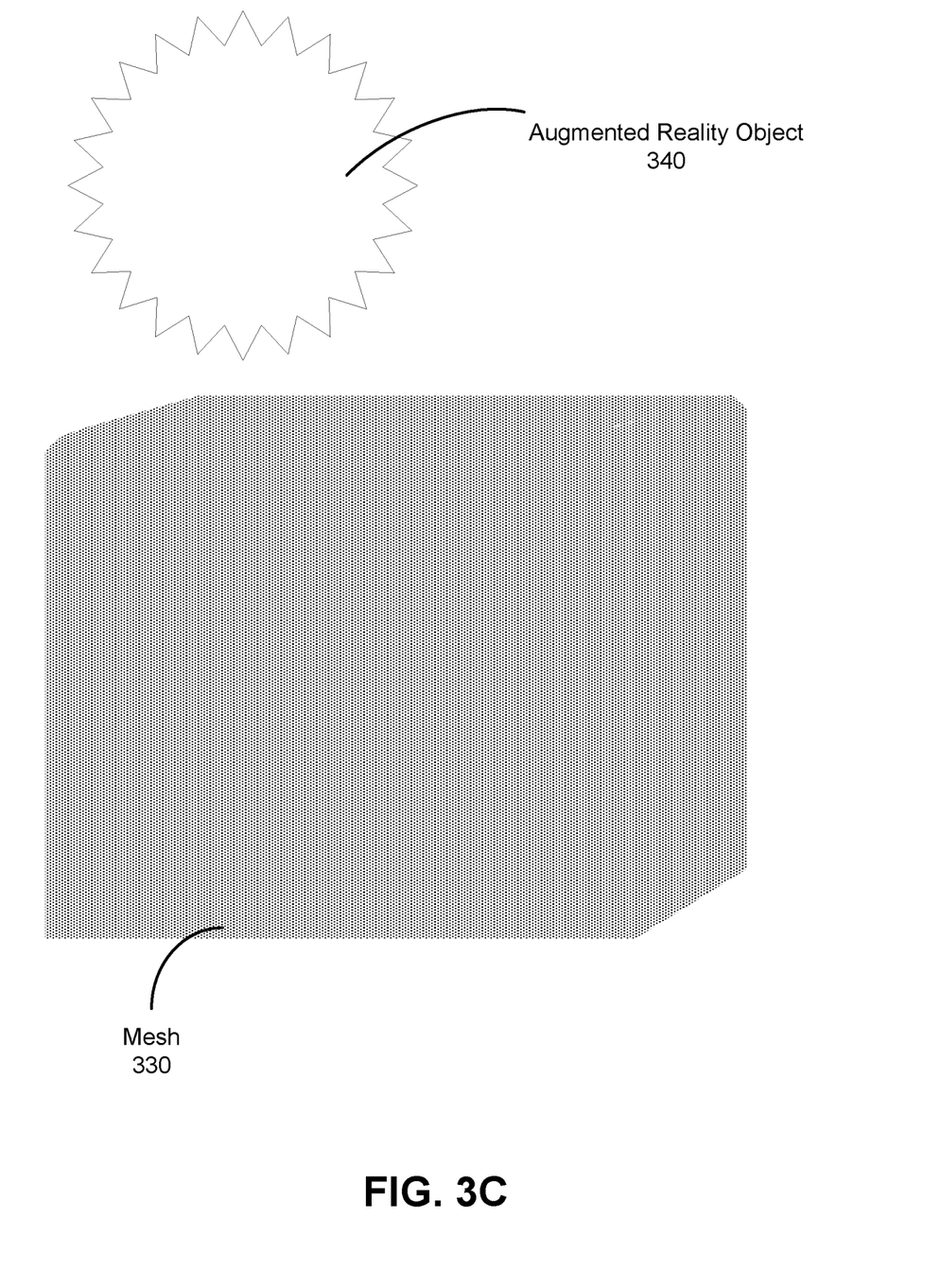

FIG. 3C shows an example of a mesh 330 and an augmented reality (AR) object 340. The mesh generation module 220 generates the mesh 330. The mesh 330 corresponds to the bounds of the cluster 320, and therefore, the general shape of the real-world object 310. The generated mesh 330 is provided to the game engine 120. The game engine 120 renders the AR object 340. In some embodiments, the user of the AR game provides input specifying a type and/or shape of the AR object 340 to the AR game system 110, via the mobile client 100. The game engine 120 may modify the AR object 340 during game play.

Figure 3D:
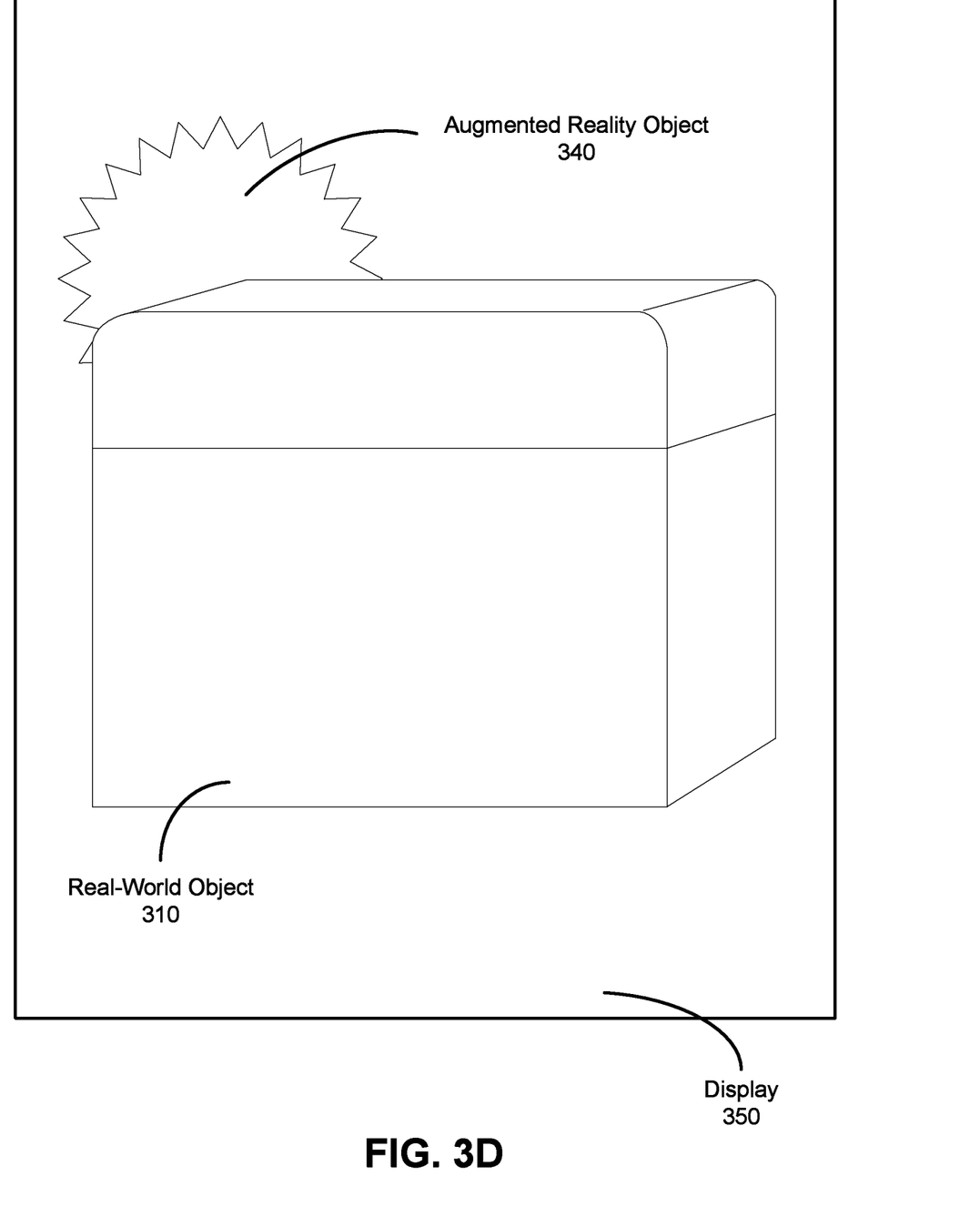

FIG. 3D shows an example of the real-world object 310 occluding the AR object 340 on a display 350. After the game engine 120 receives the mesh 330, and determines that a location of the mesh 330 coincides with a location of the generated AR object 340, the game engine 120 presents the AR object 340 as partially and/or fully occluded by the real-world object 310. The game engine 120 provides the AR object 340 being partially and/or fully occluded by the real-world object 310 to the rendering module 230. The rendering module 230 provides the occlusion of the AR object 340 to the mobile client 100 for presentation via the display 350. The display 350 may be a component of and/or coupled to the mobile client 100. In some embodiments, the user of the AR game interacts with the AR object 340 via the mobile client 100, causing a change to the occlusion of the AR object 340. For example, the user may provide input that results in movement of the AR object 340 away from the real-world object 310. Accordingly, the real-world object 310 may no longer occlude the AR object 340. In other embodiments, as described above, the user may select a second real-world object for occluding the AR object 340.

Figure 4:
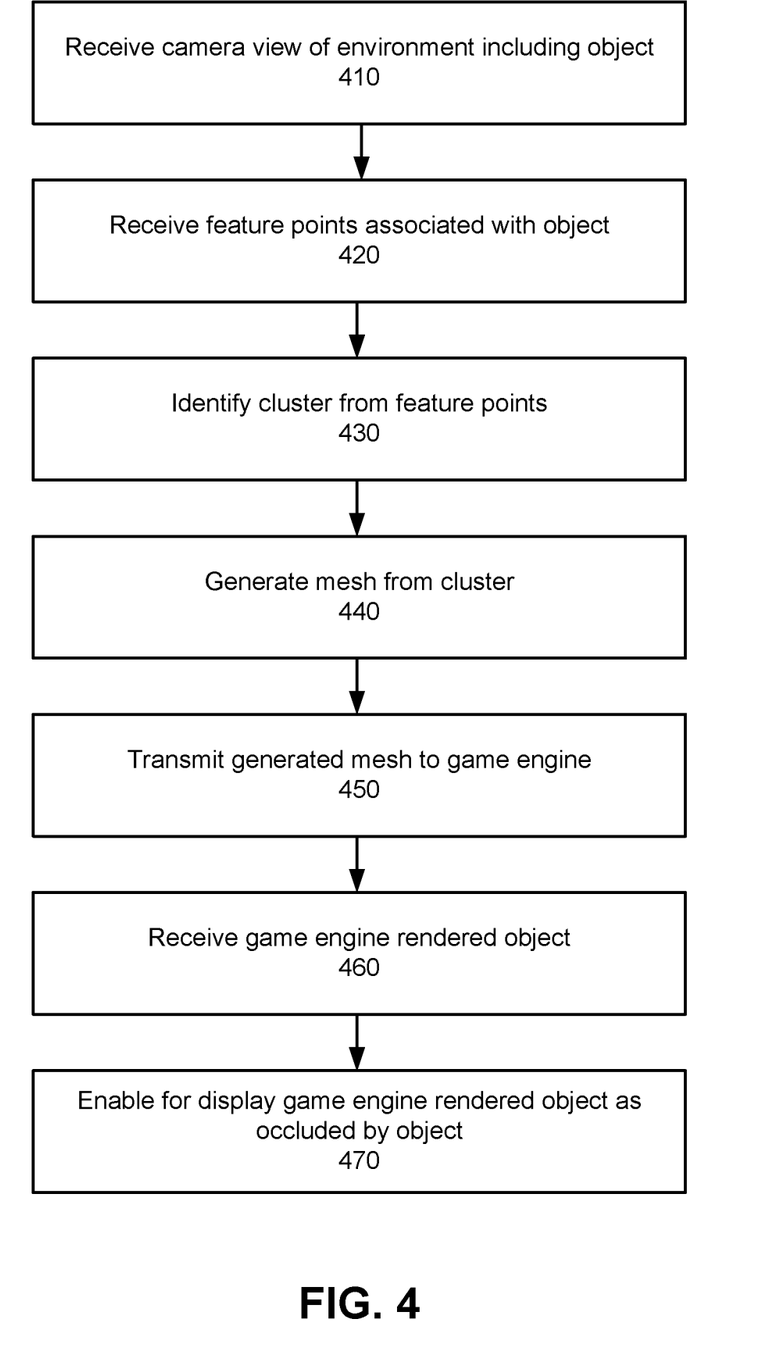
FIG. 4 illustrates one example embodiment of a process for rendering an occluded object in an AR game system.

FIG. 4 illustrates one example embodiment of a process for rendering an occluded object in an AR game system (e.g., the AR game system 110). An object occlusion application (e.g., the object occlusion application 130) receives 410 a camera view of an environment surrounding a user. The camera view includes an object (e.g., the real-world object 310). In some embodiments, a mobile client (e.g., the mobile client 100) provides the camera view to the object occlusion application. In other embodiments, the object occlusion application receives the camera view from an external source.

The object occlusion application 130 receives 420 feature points (e.g., the feature points 325) associated with the object. In some embodiments, a game engine (e.g., the game engine 120) generates the feature points and provides them to the object occlusion application.

The object occlusion application 130 identifies 430 a cluster (e.g., the cluster 320) from the received feature points. The cluster, identified from a group of feature points that are less than a threshold distance of one another, corresponds to physical surfaces of the real-world object.

The object occlusion application 130 generates 440 a mesh (e.g., the mesh 330) from the cluster. The mesh corresponds to the bounds of the cluster and therefore to a shape (e.g., which may incorporate fine details of the shape including texture depending on the density of the mesh) of the real-world object. In some embodiments, the object occlusion application generates the mesh based on a classification of the real-world object by a machine learned classifier.

The object occlusion application 130 provides (or transmits) 450 the mesh to the game engine 120. The game engine 120 represents the mesh on a virtual coordinate plane such that game engine rendered objects may interact with the mesh.

The object occlusion application 130 receives 460 a game engine rendered object (e.g., the augmented reality object 340) from the game engine 120. In some embodiments, the user selects a type of the game engine rendered object. In other embodiments, the game engine 120 renders the game engine rendered object based on the user's play of an AR game.

The object occlusion application 130 displays (or enables or provides for display) 470 the game engine rendered object as occluded by the real-world object on the mobile client 100. The user may interact with the game engine rendered object and/or the real-world object, resulting in partial and/or full occlusion of either object. In response to a change in the camera view of the mobile client 100, the object occlusion application discards the cluster corresponding to the real-world object and the process described herein repeats. For example, the object occlusion application 130 identifies a cluster corresponding to a second real-world object. The object occlusion application 130 generates a mesh for the second real-world object corresponding to a physical surface of the second real-world object. The object occlusion application 130 transmits the generated mesh to the game engine 120 and enables rendering of the generated mesh of the second real-world object on the mobile client 100. The object occlusion application 130 renders for display, on the mobile client 100, the generated mesh and a game engine rendered object. The game engine rendered object appears partially occluded by the second real-world object in the environment.

In some embodiments, the AR game system performs object occlusion based on a location at which the AR game is being played. For example, the AR game system may be configured to be played at several locations (e.g., across a city, country, and so on). When the user is playing the AR game, the AR game system determines a location of the mobile client (e.g., via GPS, WiFi, mobile cell tower triangulation, and/or received input from a user). In some embodiments, the AR game system determines a location of the mobile client based on a camera view (e.g., by performing image classification on the camera view). The object occlusion application accesses game elements, such as AR objects, from a database (e.g., the database 240) based on the location of the mobile client. For example, the object occlusion application checks the mobile client's location against "playable locations" stored in the database, and provides those corresponding to the location to the game engine. In instances where the user is less than a threshold distance from a playable location, the object occlusion application accesses game elements associated with the playable location. Accordingly, the user playing the AR game may have access to a variety of AR objects, each of which may occlude and/or be occluded by real-world objects, throughout game play, based on the user's location. In some embodiments, the user can access a map view of the AR game to see which AR objects and/or other game elements are relevant across several locations.

Computing Machine Architecture

Figure 5:
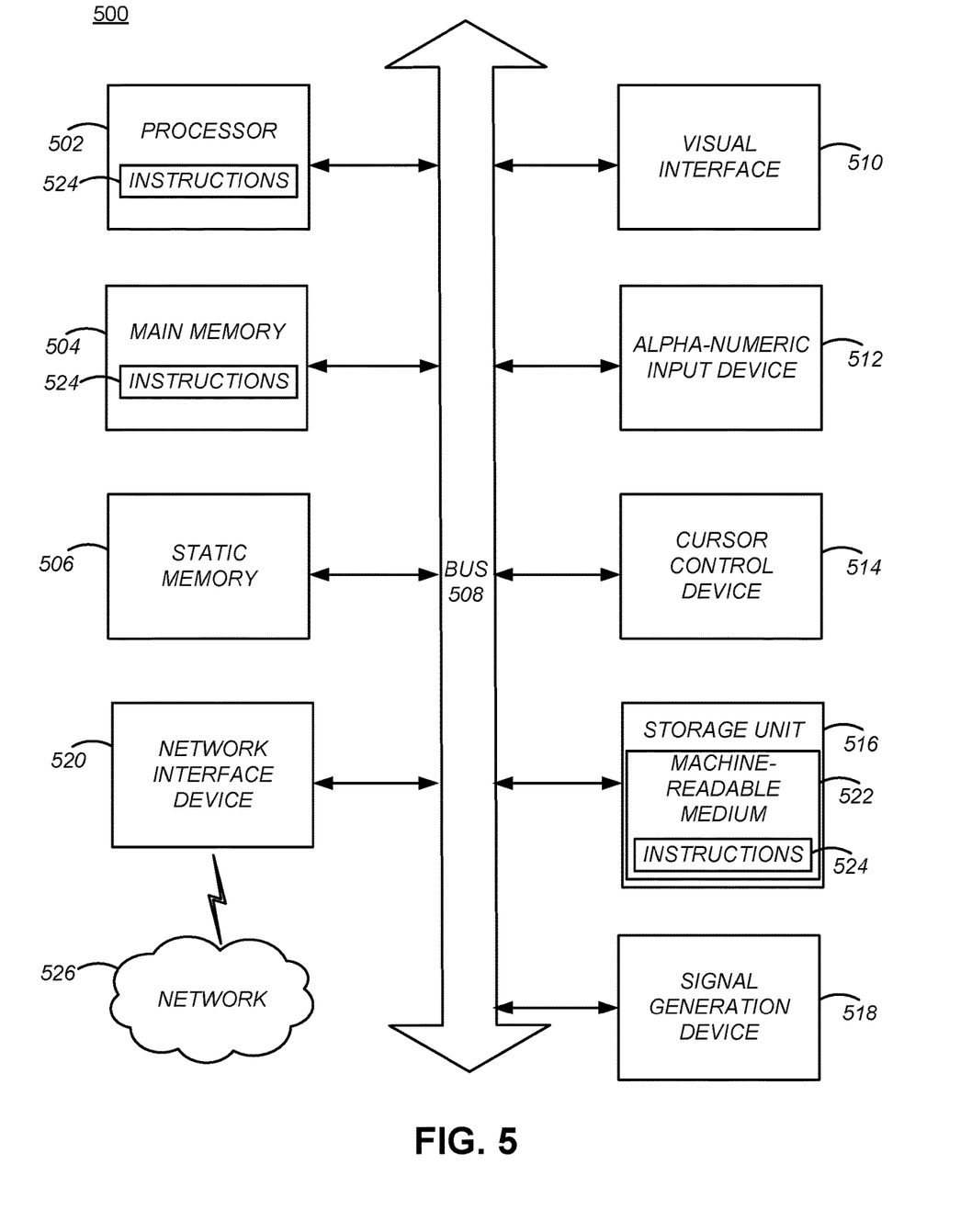
FIG. 5 illustrates a block diagram including components of an example machine able to read instructions from a machine-readable medium and execute them in a processor (or controller).

FIG. 5 is a block diagram illustrating components of an example machine able to read instructions from a machine-readable medium and execute them in a processor (or controller). Specifically, FIG. 5 shows a diagrammatic representation of a machine in the example form of a computer system 500 within which program code (e.g., software) for causing the machine to perform any one or more of the methodologies discussed herein may be executed. The program code may correspond to functional configuration of the modules and/or processes described with FIGS. 1-4. The program code may be comprised of instructions 524 executable by one or more processors 502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alphanumeric input device 512 (e.g., a keyboard or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

While playing an augmented reality (AR) game, a user may want to have an AR game element (e.g., a character, an object, etc.) interact with real-world objects in the surrounding environment. Conventional implementations for mobile clients do not allow object occlusion; rather they are limited to people occlusion. The methods described herein enable object occlusion on mobile client rendered AR game systems without consuming excessive amounts of processing power, thus presenting an immersive gaming experience to the user.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for rendering object occlusion on an augmented reality game system executed on a mobile client through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
   receiving a camera view of an environment including a first object and a bounding physical surface distinct from the first object, the camera view from a camera of a mobile client, wherein the bounding physical surface is a boundary of the environment;
   receiving a first plurality of feature points associated with the view of the environment;

distinguishing the first object from the bounding physical surface by:
  identifying a first cluster from the first plurality of feature points, the first cluster corresponding to the bounding physical surface distinct from the first object; and
  identifying a second cluster from the first plurality of feature points, the second cluster corresponding to the first object, the second cluster distinguished from the first cluster;
generating a first mesh from the second cluster corresponding to the first object;
transmitting the first generated mesh to a game engine;
enabling for display responsive to receiving a game engine rendered object, on the mobile client the first generated mesh and the game engine rendered object, the game engine rendered object appearing as partially occluded by the first object in the environment;
receiving a second plurality of feature points associated with a changed camera view of the environment, the changed camera view including a second object and the bounding physical surface distinct from the second object; and
in response to the change in the camera view from the camera of the mobile client:
  deleting the first generated mesh corresponding to the first object;
  distinguishing the second object from the bounding physical surface by:
    identifying a third cluster from the second plurality of feature points, the third cluster corresponding to the second object, the third cluster distinguished from the first cluster corresponding to the bounding physical surface; and
  generating a second mesh from the third cluster corresponding to the second object, the third cluster distinguished from the first cluster; and
  enabling for display on the mobile client, the second generated mesh corresponding to the second object and the game engine rendered object, the game engine rendered object appearing as occluded by the second object in the environment.

2. The computer-implemented method of claim 1, wherein the first plurality of feature points is identified by the game engine.

3. The computer-implemented method of claim 1, further comprising:
  identifying a plurality of clusters from the first plurality of feature points;
  determining a size of each of the plurality of clusters; and
  selecting the first cluster based on the size of each of the plurality of clusters.

4. The computer-implemented method of claim 1, further comprising:
  enabling for display on the mobile client the first generated mesh and the game engine rendered object, wherein the game engine rendered object appears fully occluded by the first object in the environment.

5. The computer-implemented method of claim 1, further comprising:
  enabling, responsive to receiving an interaction with one of the first object in the environment and the game engine rendered object, modification of the display on the mobile client.

6. The computer-implemented method of claim 1, further comprising:

receiving, responsive to receiving a selection of the second object within the changed camera view of the environment, the second plurality of feature points associated with the second object; and
transmitting the second generated mesh to the game engine.

7. The computer-implemented method of claim 1, further comprising:
  transmitting the camera view of the environment including the first object to a classifier;
  receiving, as output from the classifier, a type of the first object; and
  generating the first mesh based on the type of the first object.

8. A non-transitory computer readable storage medium comprising stored instructions, the instructions when executed by a processor cause the processor to:
  receive a camera view of an environment including a first object and a bounding physical surface distinct from the first object, the camera view from a camera of a mobile client, wherein the bounding physical surface is a boundary of the environment;
  receive a first plurality of feature points associated with the view of the environment;
  distinguish the first object from the bounding physical surface by:
    identifying a first cluster from the first plurality of feature points, the first cluster corresponding to the bounding physical surface distinct from the first object; and
    identifying a second cluster from the first plurality of feature points, the second cluster corresponding to the first object, the second cluster distinguished from the first cluster;
  generate a first mesh from the second cluster corresponding to the first object;
  transmit the first generated mesh to a game engine;
  enable for display responsive to receiving a game engine rendered object, on the mobile client the first generated mesh and the game engine rendered object, the game engine rendered object appearing as partially occluded by the first object in the environment;
  receive a second plurality of feature points associated with a changed camera view of the environment, the changed camera view including a second object and the bounding physical surface distinct from the second object; and
  in response to the change in the camera view from the camera of the mobile client:
    delete the first generated mesh corresponding to the first object;
    distinguish the second object from the bounding physical surface by:
      identifying a third cluster from the second plurality of feature points, the third cluster corresponding to the second object, the third cluster distinguished from the first cluster corresponding to the bounding physical surface; and
    generate a second mesh from the third cluster corresponding to the second object, the third cluster distinguished from the first cluster; and
  enable for display on the mobile client, the second generated mesh corresponding to the second object and the game engine rendered object, the game engine rendered object appearing as occluded by the second object in the environment.

9. The non-transitory computer readable storage medium of claim 8, wherein the instructions to receive the first plurality of feature points associated with the object correspond to instructions to receive the first plurality of feature points identified by the game engine.

10. The non-transitory computer readable storage medium of claim 8, further comprising stored instructions that when executed cause the processor to:
identify a plurality of clusters from the first plurality of feature points;
determine a size of each of the plurality of clusters; and
select the cluster based on the size of each of the plurality of clusters.

11. The non-transitory computer readable storage medium of claim 8, further comprising stored instructions that when executed cause the processor to:
enable for display on the mobile client the first generated mesh and the game engine rendered object, wherein the game engine rendered object appears fully occluded by the first object in the environment.

12. The non-transitory computer readable storage medium of claim 8, further comprising stored instructions that when executed cause the processor to:
modify, responsive to execution of the instruction to receive an interaction with one of the first object in the environment and the game engine rendered object, the display on the mobile client.

13. The non-transitory computer readable storage medium of claim 8, further comprising stored instructions that when executed cause the processor to:
receive, responsive to execution of the instruction to receive a selection of the second object within the changed camera view of the environment, the second plurality of feature points associated with the second object; and
transmit the second generated mesh to the game engine.

14. The non-transitory computer readable storage medium of claim 8, further comprising stored instructions that when executed cause the processor to:
transmit the camera view of the environment including the first object to a classifier;
receive, as output from the classifier, a type of the first object; and
generate the first mesh based on the type of the first object.

15. A computer system comprising:
one or more computer processors; and
a non-transitory computer readable storage medium comprising computer executable instructions that when executed by the one or more processors cause the one or more processors to:
receive a camera view of an environment including a first object and a bounding physical surface distinct from the first object, the camera view from a camera of a mobile client, wherein the bounding physical surface is a boundary of the environment;
receive a first plurality of feature points associated with the view of the environment;
distinguish the first object from the bounding physical surface by:
identifying a first cluster from the first plurality of feature points, the first cluster corresponding to the bounding physical surface distinct from the first object; and
identifying a second cluster from the first plurality of feature points, the second cluster corresponding to the first object, the second cluster distinguished from the first cluster;
generate a first mesh from the second cluster corresponding to the first object;
transmit the first generated mesh to a game engine;
enable for display responsive to receiving a game engine rendered object, on the mobile client the first generated mesh and the game engine rendered object, the game engine rendered object appearing as partially occluded by the first object in the environment;
receive a second plurality of feature points associated with a changed camera view of the environment, the changed camera view including a second object and the bounding physical surface distinct from the second object; and
in response to the change in the camera view from the camera of the mobile client:
delete the first generated mesh corresponding to the first object;
distinguish the second object from the bounding physical surface by:
identifying a third cluster from the second plurality of feature points, the third cluster corresponding to the second object, the third cluster distinguished from the first cluster corresponding to the bounding physical surface; and
generate a second mesh from the third cluster corresponding to the second object, the third cluster distinguished from the first cluster; and
enable for display on the mobile client, the second generated mesh corresponding to the second object and the game engine rendered object, the game engine rendered object appearing as occluded by the second object in the environment.

16. The computer system of claim 15, wherein the instructions, when executed by the one or more processors, further cause the one or more processors to:
receive, responsive to receiving a selection of the second object within the changed camera view of the environment, the second plurality of feature points associated with the second object; and
provide the second generated mesh to the game engine.

17. A computer system comprising:
a cluster module configured to:
receive a first plurality of feature points associated with a view of an environment including a first object and a bounding physical surface distinct from the first object, the plurality of feature points identified within a camera view from a camera of a mobile client, wherein the bounding physical surface is a boundary of the environment; and
distinguish the first object from the bounding physical surface by:
identifying a first cluster from the first plurality of feature points, the first cluster corresponding to the bounding physical surface distinct from the first object; and
identifying a second cluster from the first plurality of feature points, the second cluster corresponding to the first object, the second cluster distinguished from the first cluster;
receive a second plurality of feature points associated with a changed camera view of the environment, the changed camera view including a second object and the bounding physical surface distinct from the second object;
in response to the changed camera view from the camera of the mobile client:

distinguish the second object from the bounding physical surface by:
identifying a third cluster from the second plurality of feature points, the third cluster corresponding to the second object, the third cluster distinguished from the first cluster corresponding to the bounding physical surface;

a mesh generation module configured to:
generate a first mesh from the second cluster corresponding to the first object;
provide the first generated mesh to a game engine; and
in response to the change in the camera view:
delete the first generated mesh corresponding to the first object; and
generate a second mesh from the third cluster corresponding to the second object, the third cluster distinguished from the first cluster; and a rendering module configured to:
enable for display on the mobile client, responsive to receiving a game engine rendered object, the first generated mesh and the game engine rendered object, the game engine rendered object appearing as partially occluded by the object in the environment, and
enable for display on the mobile client, the second generated mesh corresponding to the second object and the game engine rendered object, the game engine rendered object appearing as occluded by the second object in the environment.

\* \* \* \* \*